Patented Sept. 7, 1954

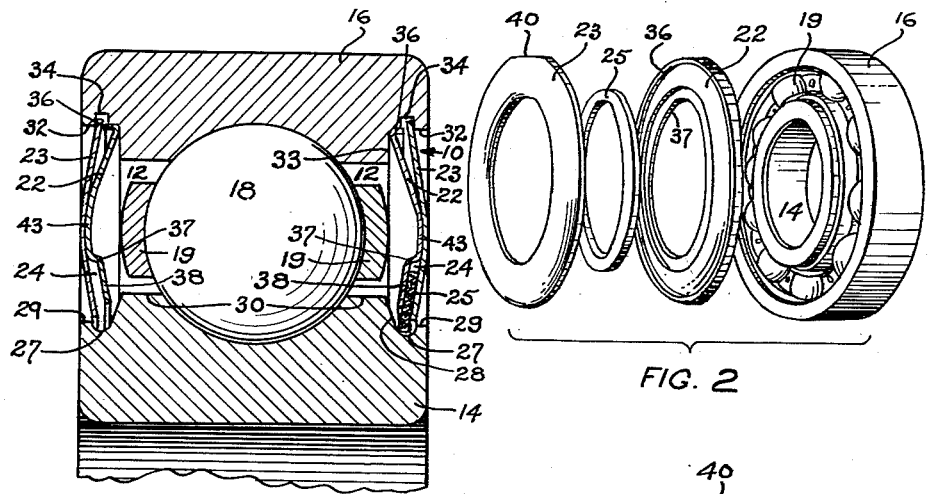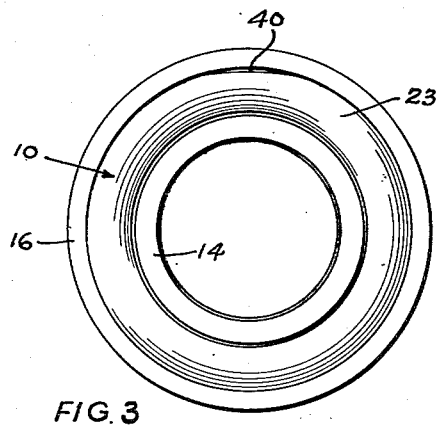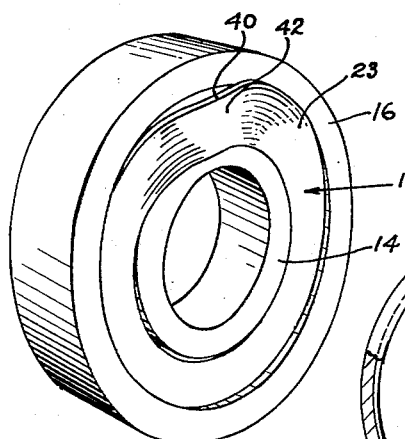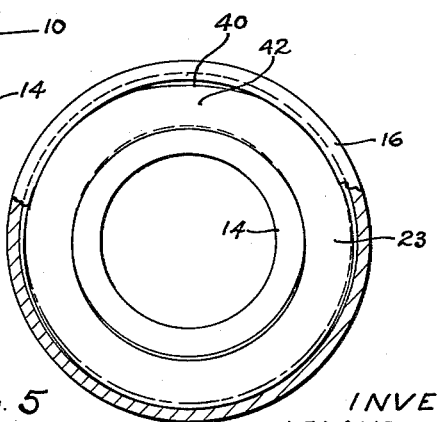

2,688,502

UNITED STATES PATENT OFFICE 2,688,502

DEMOUNTABLE SEAL

Leland D. Cobb, Forestville, Conn., assignor to General Motors Corporation, Detroit, Mich., a corporation of Delaware Application April 21, 1950, Serial No. 157,313

8 Claims. (Cl. 286—5)

This invention relates to demountable seals and particularly to an easily demountable seal that will prevent lubricant leakage from an antifriction bearing and which will also exclude dust and other deleterious materials from the bearing.

It is common practice to permanently close the end of an antifriction bearing with a seal structure which retains lubricant in the bearing for the life of the bearing and which prevents the ingress of dirt into the bearing. Such a seal structure usually includes a metal rim or member which is bent into tightly wedged sealing engagement with one of the race rings to permanently secure the seal in unit-handling relation with the bearing. This wedged mounting frequently objectionably distorts one of the bearing race rings. It is recognized that the use of an antifriction bearing under abnormal loads and/or at high temperatures causes oxidation of the lubricant to a tar-like consistency thereby producing insufficient lubrication and impeding free movement of the rolling elements, all resulting in short bearing life. These permanently installed seals make it impracticable to clean old lubricant from a permanently sealed bearing and to charge fresh lubricant into the bearing, since removal of the seal ruins the seal and often damages the bearing.

An object of this invention is to provide an improved demountable seal for retaining lubricant within an antifriction bearing and which may be repeatedly removed from and replaced in unit-handling relation with the bearing without injury to the seal or to the bearing.

Another object is to provide from sheet materials an improved and simply constructed demountable bearing seal composed of few parts that may be easily and repeatedly installed in and removed from the bearing and which will maintain an effective sealing relation even under conditions of misalignment.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is an enlarged cross sectional view of a portion of an antifriction bearing provided with two related forms of my invention;

Figure 2 is an exploded perspective view showing the parts of the right hand seal of Figure 1 and in their order of mounting in a bearing;

Figure 3 is an end elevation showing my demountable seal in a bearing;

Figure 4 is a perspective view showing the method of mounting and demounting the outer shield member of my seal; and Figure 5 is a fragmentary end elevation showing the outer shield of my seal being mounted in a bearing.

Generally considered, a demountable closure or sealing device, as 10, closes the end of an annular lubricant chamber 12 between a pair of relatively rotatable members, as antifriction bearing inner and outer race rings 14 and 16 provided with opposed raceways that cooperatively receive rolling elements, as balls 18, suitably spaced by a separator 19. A pair of inner and outer annular shields 22 and 23 having continuous unbroken peripheries laterally engage each other through a portion of their widths and radially extend across the lubricant chamber 12, the inner shield being removably seated in a counterbore in one of the race rings and the outer shield being demountably received in a race ring groove opening into this counterbore. If desired, an annular groove or channel 24, formed between these shields may receive a yieldable sealing washer 25 in lightly wiping sealing contact with the other race ring.

In the illustrations, the antifriction bearing is symmetrical at each side of a vertical plane through the centers of the balls 18. A peripherally extending groove 27, at each end of the inner race ring and generally arcuate in cross section, extends between a sloping annular wall 28, forming an extended side of the groove, and a narrow annular slinger portion 29 having a diameter between that of the bottom of the groove and that of the cylindrical inner race ring periphery 30. Each end of the outer race ring 16 has a counterbore 32 terminating in an annular shoulder 33, and an annular groove 34 radially opens throughout its length into an intermediate portion of this counterbore. The shields 22 and 23, which extend across the lubricant chamber 12 towards the groove 27, may be stamped out and bent to required shape from thin resilient sheet steel or other suitable material. These shields are laterally dished outwardly through different extents to provide ample lubricant space in the chamber 12, to add rigidity to the assembled seal and to laterally engage each other through a portion of their widths so that the shields will securely seat against the outer race ring.

The inner shield periphery is bent over to form a laterally projecting cylindrical rim 36 arranged to slidably fit within the cylindrical counterbore 32 against the shoulder 33, and the central bore through this inner shield has a diameter which is preferably slightly less than that of the race ring periphery 30. An annular stepped portion 37 on each inner shield 22 has an annular wall 38 spaced from and generally parallel to the adjacent outer shield 23 to provide between these shields the annular groove or channel 24 which opens radially inwardly into the inner race ring groove 27. The outer annular shield 23 has a central bore of a diameter slightly larger than that of the annular slinger portion 29 and has an outer peripheral diameter substantially the same as that at the bottom of the groove 34, a short length of this periphery being slabbed-off at 40 to provide for mounting and demounting, as will be later described.

When the lubricant chamber 12 contains a light bodied lubricant which might leak out between the small clearance space between the inner race ring 14 and the shields, I prefer to use the sealing washer 25 in the channel 24. This yieldable sealing washer, which may be of a suitable sealing material as a tightly woven resilient felt that is substantially impervious to lubricant, projects radially inwardly beyond the shields 22 and 23 into lightly wiping sealing contact with the annular wall 28 and preferably does not bottom in the groove 27. This sealing washer slidably engages the side walls of the channel 24 and has an outer diameter less than the diameter of the bottom of the channel 24 so that even in the event of misalignment the sealing washer will remain concentric with the inner race ring and maintain an efficient sealing engagement with the groove wall 28.

In assembly, the inner shield is axially slid into the counterbore 32 and located against the annular shoulder 33, the body portion of this shield being dished outwardly from the bearing. If required, the sealing washer 25 is positioned within the annular stepped portion 37 and against the groove wall 28. A portion of the outer shield periphery diametrically opposite to its slabbed-off portion 40 is sprung past the outer end of the counterbore 32 and partially entered into the groove 34. Succeeding portions of this outer shield at each side of its portion within the groove 34 are then progressively sprung radially inwardly past the outer end of the counterbore 32 and into the groove 34 until a short portion of the shield bulges at 42 adjacent the slabbed-off peripheral portion 40 as shown in Fig. 4. The periphery of the outer shield diametrically opposite to the slabbed-off portion 40 now bottoms in the groove 34 as shown in Fig. 5 and inward pressure against the bulge 42 will snap the slabbed-off edge 40 past the outer end of the counterbore 32 and into the groove 34 to the position shown in Figures 1 and 3. The resilient dished outer shield when mounted will be laterally sprung against an intermediate annular portion 43 of the inner shield 22 and against the outer edge of the groove 34 thus assuring that both shields firmly seat against the outer race ring 16. In demounting my seal the outer shield may be easily pried loose by entering a screw driver or other suitable sharp-ended tool between the outer race ring and the slabbed-off portion 40. Due to the initial dished contour of the thin resilient outer shield, this shield is easily and temporarily deformed without injury as it is progressively sprung into and out of operative position. Hence, the seal parts may be repeatedly removed and replaced without damage to the seal or to the bearing.

I claim:

1. In a seal for demountable positioning across an annular lubricant chamber between a pair of relatively rotatable members one of which has a counterbore, a shoulder at the end of the counterbore, said counterbored member having an annular groove radially opening throughout its length towards the other member and into an intermediate portion of the counterbore, a laterally dished annular shield peripherally seated in the end of the counterbore beyond said groove against said shoulder and extending across the lubricant chamber, a second dished endless annular shield of resilient sheet material extending across the lubricant chamber and demountably sprung into said groove and laterally engaging an intermediate portion of the other shield, and the second shield having an unbroken periphery provided with a slabbed-off portion in clearance relation to the wall of the counterbore to permit mounting and demounting of said shield.

2. In a seal for demountable positioning across an annular lubricant chamber between a pair of relatively rotatable members one of which has a counterbore, an annular shoulder at the end of the counter bore, said counterbored member having an annular groove radially opening throughout its length into an intermediate portion of the counterbore, a pair of cooperating endless annular shields of sheet material having uninterrupted peripheries and radially extending alongside the lubricant chamber, one of the shields having a laterally bent over peripheral rim demountably seated in the counterbore beyond said groove and against the annular shoulder, the other shield laterally engaging the first-mentioned shield and having its periphery demountably seated in said groove, and said other shield having a slabbed-off peripheral portion in clearance relation to the wall of the counterbore and which allows for entering said shield in and removing it from the groove.

3. In a seal for demountable positioning across an annular lubricant chamber between a pair of relatively rotatable inner and outer members, one of said members having a counterbore and an annular groove radially opening towards said other member and into an intermediate portion of the counterbore, the other member having an annular groove radially opening towards the counterbore, an annular inner shield demountably seated in the counterbore beyond the groove and extending across the lubricant chamber into closely spaced relation with one side of the groove in said other member, an endless annular outer shield of sheet resilient material peripherally and demountably seated in the groove opening into the counterbore and extending into closely spaced relation with the other side of said groove in said other member, the outer shield being laterally dished into resilient engagement with only an intermediate annular portion of the inner shield, and the outer shield having a slabbed-off portion in clearance relation to the wall of the counterbore to allow the outer shield to be entered into and removed from said groove.

4. In a seal for demountable positioning across an annular lubricant chamber between a pair of relatively rotatable members, one of said members having a counterbore terminating in a shoulder and having an annular groove radially opening throughout its length into an intermediate portion of the counterbore, the other member having an annular groove radially opening towards the counterbore, a pair of annular inner and outer cooperating shields of resilient sheet material and extending across the lubricant chamber, the annular outer shield being endless, said shields being dished into lateral resilient engagement with each other and forming an annular groove radially opening into the groove in said other member, a continuous peripheral rim on the inner shield demountably seated in the counterbore against the shoulder, an uninterrupted peripheral portion on the outer shield demountably sprung into the groove which opens into said counterbore, and a slabbed-off portion on the outer shield periphery in clearance relation to the wall of the counterbore to provide for installation and removal of the outer shield.

5. In a seal for demountable positioning across an annular lubricant chamber between a pair of relatively rotatable members, one of said members having a counterbore terminating in a shoulder and having an annular groove opening into an intermediate portion of the counterbore, an annular inner shield demountably seated in the counterbore against the shoulder and beyond said groove and extending alongside the lubricant chamber into closely spaced surrounding relation with the other member, an endless annular outer shield of resilient sheet material demountably sprung into said groove and laterally sprung into resilient engagement against only an intermediate annular portion of the inner shield and extending alongside the lubricant chamber into closely spaced surrounding relation with said other member, a sealing washer supported by the shields and sealingly engaging said other member, and a part of the outer shield periphery being slabbed off forming a flattened portion in clearance relation to the wall of said counterbore to provide for insertion of said shield in and removal of the shield from said groove.

6. In a seal for demountable positioning across an annular lubricant chamber between a pair of relatively rotatable members, one of the members having a counterbore and having an annular groove radially opening into said counterbore, the other member having an annular groove radially opening towards the counterbore, a pair of inner and outer cooperating shields laterally engaging each other and extending across the lubricant chamber, the inner shield having a continuous peripheral rim demountably seated in the counterbore beyond the groove opening into the counterbore, the outer shield having an uninterrupted periphery demountably sprung into the groove opening into the counterbore, a stepped annular portion on one of the shields providing between these shields a channel opening into the groove in said other member, a sealing washer radially movable in the channel and sealingly engaging a wall of said last-mentioned groove, and a slabbed-off portion on the periphery of the outer shield located in clearance relation to the wall of the counterbore during insertion and removal of the outer shield, said slabbed-off portion providing for mounting and demounting the outer shield.

7. In a seal for demountable positioning across an annular lubricant chamber between a pair of relatively rotatable inner and outer members, the outer member having a counterbore and having a groove radially opening into an intermediate portion of the counterbore, the inner member having an annular sealing groove radially opening towards the counterbore and provided with a sloping side wall, inner and outer dished endless annular shields of sheet resilient material and extending across the lubricant chamber, a peripheral rim on the inner shield demountably seated in the counterbore beyond the outer member groove, the outer shield having an unbroken periphery demountably sprung into the outer member groove and having a slabbed-off peripheral portion in clearance relation to the wall of the counterbore to facilitate mounting and demounting of said shield, a stepped annular shield portion on one of the shields and providing between the shields an annular channel opening into the inner member groove, and a sealing washer radially slidable in the channel and sealingly engaging the sloping wall of the inner member groove.

8. In a seal for demountably positioning across an annular lubricant chamber between a pair of relatively rotatable members, one of said members having a counterbore terminating in an annular shoulder and having an annular groove radially opening towards said other member and into an intermediate portion of the counterbore, an annular inner shield radially extending alongside the lubricant chamber into proximity with said other member, the inner shield having an uninterrupted periphery demountably seated in the counterbore against the shoulder, a laterally dished endless annular outer shield of resilient sheet material and having an uninterrupted periphery demountably received in said groove in spaced relation to the inner shield and radially extending into closely spaced relation with said other relatively rotatable member and laterally sprung against an intermediate portion of said inner shield, and a flattened peripheral portion on the outer shield which is in clearance relation to the wall of the counterbore during insertion and removal of the outer shield.

References Cited in the file of this patent

UNITED STATES PATENTS

| Number | Name | Date |
| --- | --- | --- |
| Re. 21,584 | Brodin | Oct. 1, 1940 |
| 135,127 | Katzenstein | Jan. 21, 1873 |
| 1,460,939 | Boyer | July 3, 1923 |
| 1,498,674 | Runge | June 24, 1924 |
| 1,901,580 | Bott | Mar. 14, 1933 |
| 1,903,217 | Hodge | Mar. 28, 1933 |
| 2,186,277 | Tetens | Jan. 9, 1940 |
| 2,419,885 | Cooper | Apr. 29, 1947 |
| 2,467,049 | Peterson | Apr. 12, 1949 |
| 2,530,052 | Firth | Nov. 14, 1950 |

FOREIGN PATENTS

| Number | Country | Date |
| --- | --- | --- |
| 580,435 | Great Britain | Sept. 6, 1946 |